United States Patent
Porter

[15] 3,668,678
[45] June 6, 1972

[54] BULB OUTAGE INDICATOR FOR MULTI-LAMP CIRCUITS

[72] Inventor: Philip J. Porter, Royal Oak, Mich.
[73] Assignee: General Motors Corporation, Detroit, Mich.
[22] Filed: Oct. 1, 1970
[21] Appl. No.: 77,230

[52] U.S. Cl. .................................................. 340/251, 340/73
[51] Int. Cl. .................................................................. B60q 1/38
[58] Field of Search .................................................... 340/251

[56] References Cited

UNITED STATES PATENTS 2,074,212  3/1937  Mislin ...................................... 340/251
3,470,531  9/1969  Hayden .................................... 340/251

*Primary Examiner*—Thomas B. Habecker
*Attorney*—Jean L. Carpenter and Paul Fitzpatrick

[57] ABSTRACT

A bulb outage indicator in conjunction with a vehicle turn signal flasher circuit. The flasher circuit includes a relay periodically energized and deenergized to control a set of normally open contacts to supply current from a source to the turn signal lamps. The relay also includes a second set of normally open contacts in series with the source, a set of normally closed contacts, and an indicating lamp. The set of normally closed contacts is controlled by a current sensitive coil in series with the vehicle turn signal lamps. The current sensitive coil is sensitive to the total current supplied to the lamps when all the lamps are operating and is insensitive to the current supplied to the lamps when one or more of the lamps have failed. When one of the turn signal lamps has failed, the set of normally closed relay contacts remains closed and the two sets of normally open relay contacts periodically flash the remaining turn signal lamps and the indicator lamp to indicate a lamp failure.

1 Claim, 1 Drawing Figure

PATENTED JUN 6 1972 3,668,678
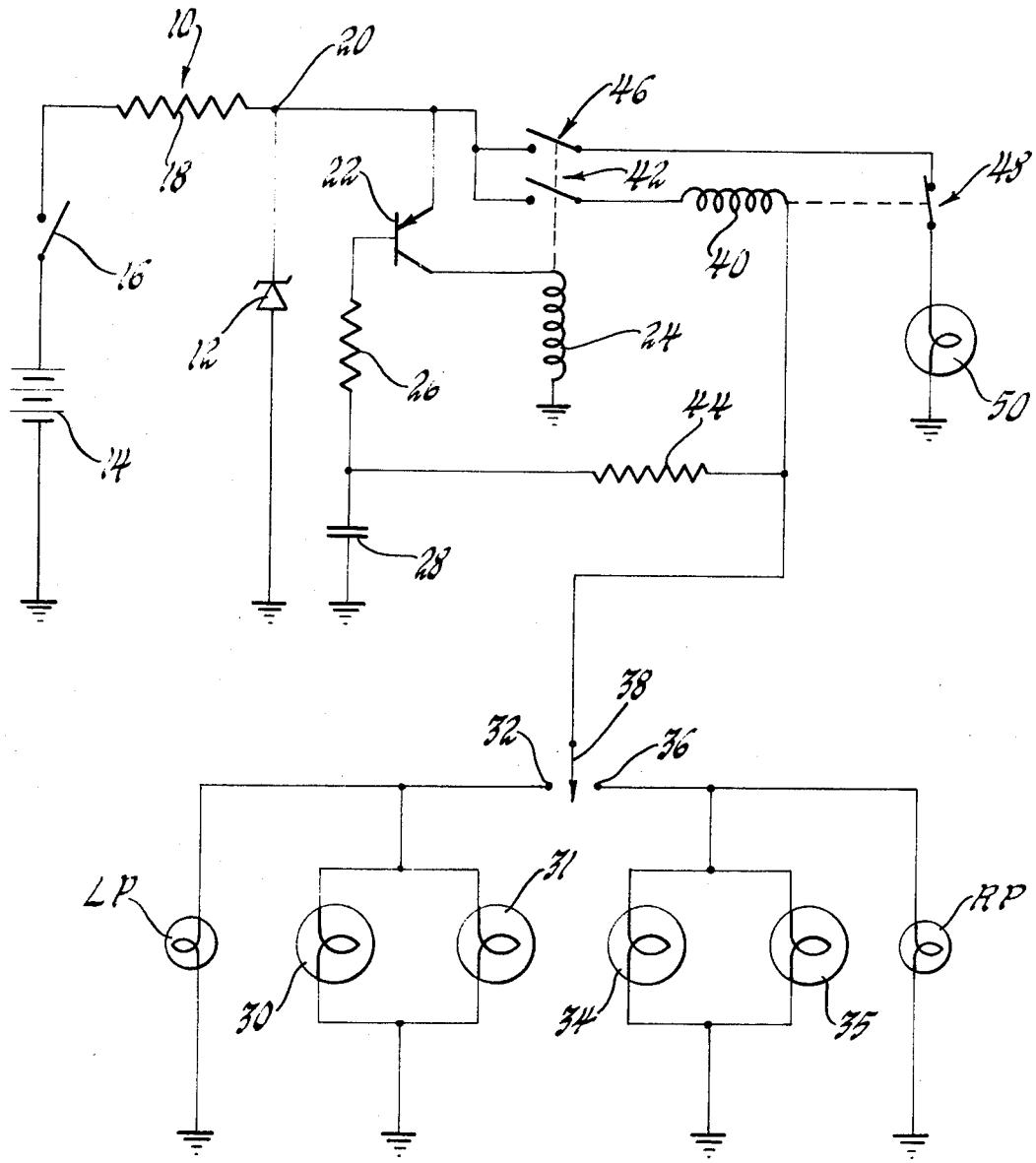
INVENTOR.
Philip J. Porter
BY
Paul Fitzpatrick
ATTORNEY

BULB OUTAGE INDICATOR FOR MULTI-LAMP CIRCUITS

This invention relates to a bulb outage indicator, and more specifically this invention relates to a bulb outage indicator in which a failure of one or more of a plurality of parallel connected lamps is indicated each time current is supplied to the remaining lamps.

Lamp outage indicators are known and are frequently used in applications where the lamps are in a position where they are not easily observed. These indicators may take the form, for example, of a resistive bridge or a pair of oppositely wound coils which sense the current imbalance generated by a lamp failure. In addition, lamp failure indicators have taken the form of current sensitive relay coils. It is to this form of lamp outage indicator that this invention is directed.

The present invention has particular application to vehicle lighting systems. As most of the vehicle lamps are not easily observed by the operator of the vehicle while the vehicle is in operation, a failure of a vehicle lamp may be overlooked. A lamp outage indicator would provide the information of a lamp failure to the vehicle operator.

It is the general object of the present invention to provide for an improved lamp outage indicator which gives an indication of a failure of one or more of a plurality of parallel connected lamps.

It is another object of the present invention to provide an indication of the failure of one or more of a plurality of parallel connected lamps each time current is supplied to the lamps while one or more of the lamps have failed.

These and other objects of this invention are accomplished by means of a set of normally open relay contacts in series with a set of normally closed relay contacts and an indicator, the set of normally open relay contacts being closed whenever current is supplied to a plurality of parallel connected lamps. The set of normally closed relay contacts is controlled by a current sensitive coil through which the current is supplied to the plurality of parallel connected lamps. If all the lamps are operable, each time current is supplied to the plurality of lamps the set of normally closed relay contacts is opened to prevent the energization of the indicator. Upon the failure of one or more of the plurality of lamps, the current through the current sensitive coil is insufficient to energize it and the normally closed relay contacts remain closed. The indicator is then energized through the set of normally open relay contacts when current is supplied to the remaining lamps.

In the preferred embodiment of this invention as hereinafter described, the lamp outage indicator is described in conjunction with a vehicle turn signal flasher circuit. It will be understood by one skilled in the art that the lamp outage indicator is not limited in use with a vehicle turn signal system but may be utilized in conjunction with any lamp circuit utilizing a plurality of parallel connected lamps.

The invention may be best understood by the following description of a preferred embodiment in conjunction with the FIGURE which is a schematic diagram of a vehicle turn signal flasher circuit incorporating the lamp outage indicator.

Referring to the FIGURE, a regulated voltage supply 10 is comprised of a Zener diode 12 in parallel with the vehicle battery 14, the vehicle ignition switch 16, and a current limiting resistor 18. The anode of the Zener diode 12 and the negative terminal of the vehicle battery 14 are connected to ground. The output of the regulated voltage supply 10 is a regulated voltage at the cathode of the Zener diode 12 as taken from a junction point 20 whenever the vehicle ignition switch is closed.

The vehicle turn signal flasher circuit includes a PNP transistor 22 having its emitter connected to the junction point 20 and its collector connected to ground through a relay coil 24. The base of the transistor 22 is connected to ground through a resistor 26 and a capacitor 28. A pair of left turn signal lamps 30 and 31 and a left pilot lamp LP are connected in parallel between ground and a stationary contact 32. A pair of right turn signal lamps 34 and 35 and a right pilot lamp RP are connected in parallel between ground and a stationary contact 36. The pilot lamps LP and RP are positioned within the vehicle so as to be easily observed by the operator. A turn signal switch 38 is manually operable to engage the stationary contact 32 when it is desired to indicate a left turn and to engage the stationary contact 36 when it is desired to indicate a right turn. The turn signal switch 38 is connected to the junction point 20 through a current sensitive relay coil 40 and a set of normally open relay contacts 42. The junction between the resistor 26 and the capacitor 28 is connected to the turn signal switch 38 through a resistor 44. A series circuit which includes a set of normally open relay contacts 46, a set of normally closed relay contacts 48, and an indicating lamp 50 is connected between the junction point 20 and ground. The indicating lamp 50 is placed so as to be easily observed by the operator.

The sets of normally open relay contacts 42 and 46 are controlled by the relay coil 24 such that when the relay coil 24 is energized, the set of normally open relay contacts 42 is closed to complete a circuit from the junction point 20 to ground through the resistor 44 and the capacitor 28 and to the turn signal switch 38 and the set of normally open relay contacts 46 is closed to complete a circuit from the junction point 20 to the set of normally closed relay contacts 48. The set of normally closed relay contacts 48 is controlled by the current sensitive relay coil 40 such that when the relay coil 40 is energized, the set of normally closed relay contacts 48 is opened.

In operation, when the ignition switch 16 is closed, the transistor 22 is immediately biased in conduction since the capacitor 28 is initially in a discharged condition. The relay coil 24 is therefore energized to close the set of normally open relay contacts 42. The capacitor 28 is then charged through the current sensitive relay coil 40 and the resistor 44 until the transistor 22 is biased into non-conduction to deenergize the relay coil 24. The capacitor 28 is maintained charged by current flow from the emitter to the base of the transistor 22.

When it is desired to indicate a left or right turn, the vehicle operator positions the turn signal switch 30 to engage either the stationary contacts 32 or 36 respectively. A discharge path is then provided for the capacitor 28 through the resistor 44 and the lamps 30, 31 and LP or 34, 35 and RP respectively. As the capacitor 28 discharges, the bias on the base of the transistor 22 decreases until the transistor 22 is biased into conduction. The relay coil 24 is thereby energized to close the sets of normally open relay contacts 42 and 46. Upon the closure of the set of relay contacts 42, current is supplied to the left or right turn lamps 30 and 31 or 34 and 35 respectively, through the current sensitive relay coil 40 and they are energized to provide the desired turn indication. Also, the pilot lamps LP and RP are energized to inform the operator of the flasher operation. In addition, the capacitor 28 is again charged through the current sensitive relay coil 40 and the resistor 44 until the transistor 22 is biased into non-conduction to deenergize the relay coil 24 to open the set of normally open relay contacts 42 to again repeat the cycle as previously described.

Since the voltage at the junction point 20 is constant, the current through the current sensitive relay coil 40 will be a maximum when all the lamps 30, 31 and LP or 34, 35 and RP are operable and will decrease upon the failure of one of the lamps. The characteristics of the current sensitive coil 40 are chosen so as to be sensitive to a minimum current which is equal to the current through the current sensitive coil 40 when both the lamps 30 and 31 or 34 and 35 are operable to open the set of normally closed relay contacts 48. Therefore, upon the failure of one of the lamps 30 or 31, or 34 or 35, the current sensitive relay coil 40 is insensitive to the decreased current therethrough and does not respond to open the set of normally closed relay contacts 48. The current through the pilot lamp LP or RP is very small and the foregoing operation is not effected by a failure thereof.

The bulb outage indication will now be described. When the turn signal switch 38 is positioned to engage the stationary contacts 32 or 36 to indicate a left or right turn respectively, current is periodically supplied to the lamps 30 and 31 or 34 and 35 respectively as previously described upon the energization of the relay coil 24 which closes the sets of normally open relay contacts 42 and 46. Simultaneously therewith, the current sensitive relay coil 40 is responsive to the current supplied to the lamps 30 and 31 or 34 and 35 to open the set of normally closed relay contacts 48. The time period between the closing of the normally open relay contacts 46 and the opening of the normally closed relay contacts 48 is very small and is insufficient to illuminate the indicator lamp 50. Therefore, as long as all the lamps 30 and 31 or 34 and 35 are operable, the set of normally closed relay contacts 48 is open when the set of normally open relay contacts 46 is closed and conversely, the set of normally open relay contacts 46 is open when the set of normally closed relay contacts 48 is closed. Therefore, the indicator lamp 50 is continually deenergized while all the lamps 30 and 31 or 34 and 35 are operable. Upon the failure of one of the lamps 30 or 31, or 34 or 35, the current through the current sensitive relay coil 40 decreases as previously described and the current sensitive relay coil 40 remains deenergized. Therefore, the set of normally closed relay contacts 48 remains continually in its normally closed position and, as the relay coil 24 is periodically energized to illuminate the remaining operable lamp, a circuit is closed between the junction point 20 and ground through the set of normally open relay contacts 46, which is closed by the relay coil 24, and the set of normally closed relay contacts 48 to energize the indicating lamp 50. The indicating lamp 50 will be periodically flashed as the relay coil 24 is periodically energized to indicate the lamp failure.

While the invention has been described with regard to a preferred embodiment thereof, this should not be construed in a limiting sense. Numerous modifications, variations, and applications will occur to those skilled in the art. For a definition of the invention, reference is made to the appended claims.

It is claimed:

1. A lamp flashing circuit having lamp outage indication comprising a constant voltage source; first relay means including a coil and first and second sets of normally open contacts, the coil being operable when energized to close the first and second normally open contacts; a second relay means including a current sensitive coil and a set of normally closed contacts, the current sensitive coil being operable when energized to open the normally closed contacts; a first series circuit including the constant voltage source, the first set of normally open contacts, the current sensitive coil and a plurality of lamps connected in parallel; a transistor connected in series with the coil and the constant voltage source; a capacitor coupled to the transistor, the capacitor rendering the transistor non-conductive when charged and rendering the transistor conductive when discharged; resistive means connecting the capacitor to the constant voltage source through the first set of normally open contacts when the coil is energized and connecting the capacitor to the plurality of lamps when the coil is deenergized, whereby the capacitor is alternately charged and discharged to render the transistor alternately non-conductive and conductive to alternately supply current from the constant voltage source to flash the plurality of lamps, the current supplied to the plurality of lamps having a greatest magnitude when all the lamps are operable and having a magnitude less than the greatest magnitude when one or more of the lamps have failed, the current sensitive coil being operable to open the set of normally open contacts upon the flow of a predetermined minimum current therethrough, the predetermined minimum current being equal to the current supplied to the plurality of lamps when all the lamps are operable; and a series circuit including the constant voltage source, the second set of normally open contacts, the set of normally closed contacts and indicating means, the indicating means being energized by a flow of current therethrough, whereby the indicating means is periodically energized to indicate a lamp failure when one or more of the plurality of lamps have failed.

* * * * *